(12) United States Patent
Cavallini et al.

(10) Patent No.: US 10,377,074 B2
(45) Date of Patent: Aug. 13, 2019

(54) BLOWING MOLD FOR BLOWING THERMOPLASTIC MATERIAL CONTAINERS

(71) Applicant: S.I.P.A. SOCIETA' INDUSTRIALIZZAZIONE PROGETTAZIONE E AUTOMAZIONE S.P.A., Vittorio, Veneto (IT)

(72) Inventors: Franco Cavallini, Treviso (IT); Matteo Zoppas, Conegliano (IT)

(73) Assignee: S.I.P.A. Societá Industrializzazione Progeitazione E Automazione S.P.A., Vittorio Veneto (IT)

( * ) Notice: Subject to any disclaimer, the term of this patent is extended or adjusted under 35 U.S.C. 154(b) by 53 days.

(21) Appl. No.: 15/736,526

(22) PCT Filed: Jun. 14, 2016

(86) PCT No.: PCT/IB2016/053500
§ 371 (c)(1),
(2) Date: Dec. 14, 2017

(87) PCT Pub. No.: WO2016/203367
PCT Pub. Date: Dec. 22, 2016

(65) Prior Publication Data
US 2018/0154571 A1   Jun. 7, 2018

(30) Foreign Application Priority Data

Jun. 15, 2015   (IT) .................. 102015000023671

(51) Int. Cl.
| | |
|---|---|
| *B29C 49/56* | (2006.01) |
| *B29C 49/06* | (2006.01) |
| *B29C 49/42* | (2006.01) |
| *B29C 49/48* | (2006.01) |
| *B29K 101/12* | (2006.01) |

(52) U.S. Cl.
CPC ............ *B29C 49/06* (2013.01); *B29C 49/421* (2013.01); *B29C 49/4215* (2013.01); *B29C 49/56* (2013.01); *B29C 49/48* (2013.01); *B29C 2049/566* (2013.01); *B29K 2101/12* (2013.01)

(58) Field of Classification Search
CPC .... B29C 49/48; B29C 49/56; B29C 2049/563
USPC .......................................... 425/541
See application file for complete search history.

(56) References Cited

U.S. PATENT DOCUMENTS

| | | | |
|---|---|---|---|
| 6,951,629 B2 * | 10/2005 | Kronseder ............ | B29C 49/56 264/523 |
| 2004/0151797 A1 * | 8/2004 | Mue ...................... | B29C 33/26 425/450.1 |

(Continued)

*Primary Examiner* — James P Mackey
(74) *Attorney, Agent, or Firm* — Abelman, Frayne & Schwab (57) ABSTRACT

Blowing mold (10, 100) for blowing thermoplastic material containers, comprising two half molds (1, 2) and a device for the cyclic opening and closing of the half molds (1, 2) which comprises a control shaft connected to the half molds by means of connecting rods (14, 20) and a control hub (15). The control hub is provided with a plurality of holes appropriately positioned so that by choosing the holes to which the connecting rods are hinged, it is possible to change the maximum opening angle of the mold.

11 Claims, 11 Drawing Sheets

(56) References Cited

U.S. PATENT DOCUMENTS

2007/0292550 A1* 12/2007 Klatt ...................... B29C 49/56
          425/183
2011/0117237 A1*  5/2011 Penninger ............... B29C 33/26
          425/540

* cited by examiner

BLOWING MOLD FOR BLOWING THERMOPLASTIC MATERIAL CONTAINERS

CROSS-REFERENCE TO RELATED APPLICATION

This application claims benefit under 35 U.S.C. § 317 to international application No. PCT/IB2016/053500, filed on Jun. 14, 2016, which claims priority to Italian application no. 102015000023671, filed Jun. 15, 2015, the contents of which are incorporated by reference in their entireties.

FIELD OF THE INVENTION

The present invention relates to a device for opening and closing a mold for blowing thermoplastic material containers, e.g. PET bottles, on a rotary blow molding machine.

BACKGROUND ART

The blowing or stretch blowing molds used for producing containers from a preform made of thermoplastic material which is preheated generally consist of three parts, for the particular shape of current containers at their base, which is generally concave. Therefore, generally, molds are made which consist of two lateral half molds which shape the body of the container and of a mold bottom to shape the container bottom. Therefore, the lower areas of the two half molds and the upper part of the mold bottom are provided with fixing means, of complementary shape, reciprocally insertable into each other when the mold is in the closed position, to ensure the axial rigidity of the mold in closed position in the presence of the blowing pressure, which generally reaches 40 bar when molding PET containers. The two lateral half molds are configured to move relative to each other between an open position and a closed position, under the action of electrically controlled actuating means or via cams. The same actuator means are also arranged to control the cyclic opening and closing of the mold bottom. Solutions are particularly widespread which provide for the opening and closing of the two half molds and of the mold bottom by means of cams. Usually, the maximum angle to be formed upon reaching the maximum opening of the two lateral half molds is closely related to the maximum size of the cross section of the containers to be extracted from the two half molds after molding. This therefore has an influence on the linkage and on the geometry of the cam profile. It is known that, in the case of container molding devices, the maximum productivity is measured in containers/h/cavity and is expressed as a function of cycle time, and said cycle time is made up of a step dedicated to the insertion of a preform into the mold and the closing and constraint movement of the mold, and of a step dedicated to the blow molding process, and thus the cycle time also includes a step dedicated to the release, i.e. the opening of the half molds and the extraction of the finished container from the blowing mold. Therefore, the amplitude of the maximum opening angle of the mold has an influence on the duration of the cycle time. In designing the blow molding machines of thermoplastic containers, the maximum size of the containers which can be produced in such machines and the maximum forces which are applied on the various parts of the machine, and in particular the reactions which are transmitted to the cams by the action of the actuator means during the operations, are normally defined. When containers of a certain size are to be produced, the mold is designed to open by a first maximum opening angle $\alpha 1$. If containers of smaller sizes are also to be produced on blow molding machines designed to produce containers of a larger format, and thus to open by the first maximum opening angle $\alpha 1$, a maximum opening angle of the mold $\alpha 2$ smaller than $\alpha 1$ would be sufficient for the extraction of the smaller container from the mold. Disadvantageously, if such smaller bottles are to be produced, since the mold is opened by the maximum design opening angle, i.e. $\alpha 1$, which is associated with larger bottle sizes, the maximum theoretical productivity achievable by the blow molding machine is reduced because of the longer time taken to open and close the half molds by the aforementioned angle $\alpha 1$. This is a strong limit to the increase of the productivity of blow molding machines. Solutions have been proposed to try to achieve higher productivity levels for blow molding machines, according to which the molds are designed with a single value of the maximum opening angle which is reduced and hence they are able to produce smaller types of containers. For example, there are molding devices optimized to produce containers up to 0.5 liters max, or up to 2.0 liters max, etc. However, in these cases, the blow molding machines put the achievement of high productivity first, but on the other hand they lose flexibility in the production capacity of containers of different sizes.

In fact, it is not possible to produce, on the same device, containers having dimensions exceeding the limits imposed by the spaces available for the extraction of the same. In blow molding machines of this type, in order to change the maximum opening angle between the two half molds, it is necessary to intervene on the linkage members, for example by changing the size of some elements of the transmission, for example the connecting rods. However, this operation is complicated because it requires a long time both for installation and for the subsequent adjustments of the mechanical members and it is disadvantageous because it consequently forces a long interruption of production. An example of systems for the control and the cyclic closing of the mold in PET bottles which aims to improve the productivity of a blow molding machine is described in document EP 2135726, which provides for the two lateral half molds to open and close in an unequal manner to the plane of vertical symmetry of the mold. In particular, the half mold which is in retracted position, considering the direction of motion of the blow molding machine, has an opening speed which reaches its maximum value in a step prior to the step in which the half mold which is ahead reaches its maximum value. Therefore, the two maximum opening angles, which reach the two half molds when they are fully open, are of equal value but the moments in which the half molds reach these maximum angles are consecutive, i.e. not concurrent. Another example of a control system for opening and closing a blowing mold in a rotary blow molding machine is disclosed in document U.S. Pat. No. 7,871,259. In order to improve the opening and closing kinematics of the half molds and reduce the distance which separates adjacent blowing molds, this document proposes a configuration of the control system for opening and closing a blowing mold with the plane of separation of the half molds directed obliquely, in the direction of advance of the blow molding machine, by a selected angle in relation to the radial direction of the blow molding machine, and with one of the two half molds rigidly connected to the blowing wheel (not movable). A drawback of this solution is that it can pose problems of extraction of the bottle from the mold, because the bottle can remain adherent to the non-movable half mold during the extraction step by the gripping members. Therefore, the need is felt to provide a device for opening and closing the mold which offers greater flexibility in the change of the formats of the containers to be blown on the same blow molding machine.

SUMMARY OF THE INVENTION

It is an object of the present invention to provide a mold which has a device for the cyclic opening and closing of the mold itself, which allows to make a wider range of formats of containers blown and which is therefore more flexible in its production capability as compared to the prior art.

It is another object of the present invention to provide a mold for producing a broad range of formats of containers which simultaneously allows a high production capacity, or productivity.

At least one of these objects is achieved by a blowing mold for blowing a thermoplastic material container which, according to claim 1, comprises two half molds hinged to each other and a cyclic opening and closing device adapted to move the two half molds close to and away from each other with an opening angle which ranges from 0° in the closed position of the half molds to a maximum opening angle in a position of maximum opening of the two half molds, the cyclic opening and closing device comprising a control shaft adapted to rotate about its own axis Z, a control hub integrally fixed to the control shaft, at least one first connecting rod and at least one second connecting rod, each having a first end hinged to a respective half mold and a second end hinged to the control hub, wherein to a rotation of the control shaft by an angle of rotation β corresponds the position of maximum opening of the two half molds, wherein the control hub is fixed in a removable manner to one end of the control shaft and is provided with at least three holes for hinging the second ends of said at least one first connecting rod and at least one second connecting rod, wherein the at least three holes define at least two different pairs of holes, a first pair of which defines a first maximum opening configuration of the half molds corresponding to a first maximum opening angle α1, and a second pair of which defines a second maximum opening configuration of the half molds corresponding to a second maximum opening angle α2, with α2 smaller than α1, and wherein the at least one first connecting rod and the at least one second connecting rod are fastened to a respective hole of the first pair of holes when the mold can operate in the first maximum opening configuration, and they are fastened to a respective hole of the second pair of holes when the mold can operate in the second maximum opening configuration.

An advantage of the mold of the invention is that the opening angle of the two half molds, or lateral half molds, can be made to vary according to the production needs, depending on the size of the container to be blown. For example, in a preferred configuration, the maximum value of the opening angle which is formed between the two lateral half molds can take two different amplitudes α1 and α2 as desired, with α2 smaller than α1. Thereby, a smaller maximum opening angle α2 must be reached between the two lateral half molds to make a production of small containers, and this results in an increase in productivity and a decrease in the machine cycle time for the blow molding machine. On the other hand, a maximum opening angle α1 greater than α2 is used between the two lateral half molds to make a production of containers with a larger size of the cross section. The different arrangement of the holes where the connecting rods can be hinged, advantageously allows to obtain the two different maximum opening angles with equal angle of rotation of the control shaft. Advantageously, due to the solution of the invention, it is possible to shift from the maximum opening angle α1 to the maximum opening angle α2, or vice versa, in a short time and without having to effect complicated adjustments of the mold.

Preferably, there is provided a lever provided with at least one roller, or bearing, which can slide on an appropriate cam profile. The rotation of the lever, and hence of the control shaft, by an angle of rotation β produces the opening and closing motion of the two half molds by the maximum opening angle.

Preferably, the control hub is provided with four holes, or hinge points, to hinge the at least one first connecting rod and the at least one second connecting rod. In this case, the connection of the two half molds to the control hub, through the connecting rods, is preferably effected by means of the two holes, or hinge points, A and B or alternatively in the two holes C and D. Hinging the connecting rods to the holes A and B, respectively, with the rotation of the control shaft by an angle of rotation β, a maximum opening of the two half molds by an angle α1 is obtained. The distance between the holes A and B is different from the distance between the holes C and D, so that hinging the connecting rods to the holes C and D respectively, for an equal angle of rotation β of the control shaft, an opening of the two mold holders by an angle α2<α1 is obtained.

By appropriately choosing the holes where the connecting rods are to be hinged, e.g. by means of a simple 180° rotation with respect to the axis k-k of the control hub, the mold of the invention is ensured to have greater flexibility to produce container formats with a reduction of the cycle time if containers of smaller size need to be produced. Given the high hourly productivity per cavity which has been achieved by blow molding machines, due to the solution of the invention the time needed to open and close the molds is optimized according to the format of the containers to be produced, making it possible to exploit the production capacity of the blow molding machine to the maximum possible extent.

Similarly to when four holes are provided, if the control hub is provided with three holes, for example, the distance between a first hole and a second hole is appropriately selected different from the distance between the second hole and a third hole. One of the three holes, e.g. the second hole, is always used to hinge the at least one first connecting rod or the at least one second connecting rod in both maximum opening configurations.

Advantageously, the control hub is fixed to the control shaft so that it can be removed therefrom, allowing the connecting rods to be hinged to different pairs of holes.

Preferably, the control hub is fixed to an end of the control shaft, so as to facilitate the rapidity of disassembly and assembly.

According to another aspect, the invention also provides a method, according to claim 11, to change the maximum opening configuration of a blowing mold having the aforesaid characteristics, from a first maximum opening configuration to a second maximum opening configuration, comprising the steps of a) removing one or both of said at least one first connecting rod and at least one second connecting rod from said first pair of holes;

b) fixing one or both of said at least one first connecting rod and at least one second connecting rod to said second pair of holes;

so as to switch from said first maximum opening configuration, prior to step a), with a first maximum opening angle, to a second maximum opening configuration, upon completion of step b), with a second maximum opening angle different from the first maximum opening angle.

According to a further aspect, the invention provides a rotary blow molding machine comprising a plurality of molds having the aforesaid features.

The dependent claims describe preferred embodiments of the invention.

BRIEF DESCRIPTION OF THE DRAWINGS

Further features and advantages of the invention will become more apparent from the detailed description of preferred, but not exclusive, embodiments of a blowing mold having an opening and closing device shown by way of a non-limiting example with the aid of the accompanying drawings, in which.

DETAILED DESCRIPTION OF PREFERRED EMBODIMENTS OF THE INVENTION

With reference to the figures, a mold generally indicated with reference numeral 10 is shown. It is a mold adapted to be mounted in a manner known by those skilled in the art on a blow molding machine, not shown in the figures, which typically is a rotary blow molding machine which rotates about its own vertical axis. Mold 10 comprises two lateral half molds 1 and 2 and a mold bottom 8, which is particularly useful when the container to be blown has a concave base to allow the extraction of the container upon completion of the blowing cycle. The lateral half molds 1, 2 each comprise a respective external mold holder 3, 4, a shell support 5', 6' and a half shell 5, 6. The use of the half shells allows to keep the same mold holders 3 and 4 to produce containers of different formats and sizes, changing only the half shells.

In a variant of the mold of the invention, not shown, it is possible to provide for the shell supports and the shells to be made in a single shell block, thus the mold is referred to as monobloc. In this case, the format change takes place by replacing the shell block, keeping the mold holders.

The two mold holders 3, 4 are hinged to each other so that they can be opened and closed substantially like a book.

Each mold holder 3, 4 is provided with an attachment portion 21 in which a through hole is obtained. The mold 10 comprises a control hub 15 which is preferably formed by of a plate shaped portion 22, also referred to as simply plate, from which two raised portions 23, 24 extend in distal direction with respect to each face of the plate 22. The raised portions 23, 24 are positioned in an approximately central region of each face of the plate 22. In the raised portions 23, 24 is obtained a hole 25 with polygonal section, preferably square section with beveled corners, which entirely traverses them. The control hub 15 is also provided with circular through holes, mutually identical and obtained in the plate shaped portion 22. Preferably, four circular through holes are provided, indicated with the references A, B, C, D, respectively. The holes A, B, C, D are located in predetermined positions and, for a clearer description, the centers of the holes A, B, C, D are considered to be the vertices of a polygon, not shown, which in this case, since four holes are provided, is a quadrilateral. The centers of the holes A and B, and of the holes C and D define two non-consecutive sides of said quadrilateral. According to this embodiment, the distance between the centers of the holes A and B is greater than the distance between the centers of the holes C and D. Each mold holder 3, 4 is connected to the control hub 15 by means of a system of connecting rods, preferably formed by two pairs of connecting rods; each pair of connecting rods is indicated with reference numerals 14 and 20, respectively, and is connected to a respective mold holder 3, 4. In particular, a first end of each pair of connecting rods 14, 20 is hinged to the respective mold holder 3, 4 by means of the through hole of the attachment portion 21. As shall be further described, the second end of each pair of connecting rods 14, 20 is hinged to the control hub 15 by means of the holes A and B, respectively, defining a first configuration, or operating position, or by means of the holes C and D, respectively, defining a second configuration, or operating position. In other words, when the first pair of connecting rods 14 is hinged to the control hub 15 by means of the hole A, the second pair of connecting rods 20 is hinged to the control hub by means of the hole B; when the first pair of connecting rods 14 is hinged to the control hub 15 by means of the hole C, the second pair of connecting rods 20 is hinged to the control hub by means of the hole D. The mold 10 comprises a control shaft 16 apt to be positioned with its axis of rotation Z parallel to the axis of rotation of the blow molding machine. The control shaft 16 can rotate about its own axis of rotation Z. To a first end 26 of the control shaft 16 is integrally fixed the control shaft 15 by means of its hole 25 with polygonal section. Said coupling is preferably obtained providing the first end 26 of the control shaft 16 with a similarly shaped section to the one of the polygonal hole 25. To the second end 27 of the control shaft is integrally fixed a lever 13 which extends transversely with respect to the axis Z of the control shaft 16. The lever 13 is provided with a cam follower, or roller 11, integral therewith. The roller 11, which is not positioned on the axis Z, is adapted to slide on an appropriate cam track 12, partially shown. An alternative variant, not shown, provides more than one roller and respective cam tracks. To the control shaft 16 is also integrally constrained a flange 17 provided with a cam track 18 in which can slide a cam follower 19 which is integral with the mold bottom 8.

The cyclic opening and closing movement of the two lateral half molds 1 and 2 and of the mold bottom 8 is produced by a linkage comprising the control shaft 16, which can rotate about the axis Z by an angle β by means of the passage of the roller 11, which is integral with the lever 13, on the cam track 12. The rotation of the lever 13 produces the rotation of the control shaft 16 which in turn enables the control hub 15 to rotate about the axis Z and consequently the opening of the two half molds 1, 2 takes place by means of the pairs of connecting rods 14, 20. In particular, when the control shaft is rotated by the angle β, the maximum opening of the mold is obtained.

The rotation of the control shaft 16 by the angle β also produces the rotation of the flange 17 in whose cam track 18 slides the cam follower 19 which, in turn, by moving to produces alternatively the up and down motion of the mold bottom 8. In other words, the up and down motion of the mold bottom 8, concurrent, and hence synchronized with the opening and closing motion of the two half molds 1, 2, is produced by the rotation of the flange 17 integral with the control shaft 16. Indeed, the cam follower 19, traveling through the cam track 18, transforms the rotation of the control shaft 16, and hence of the flange 17, by an angle β in a vertical motion δ, along a parallel direction to the axis Z.

Figure 1:
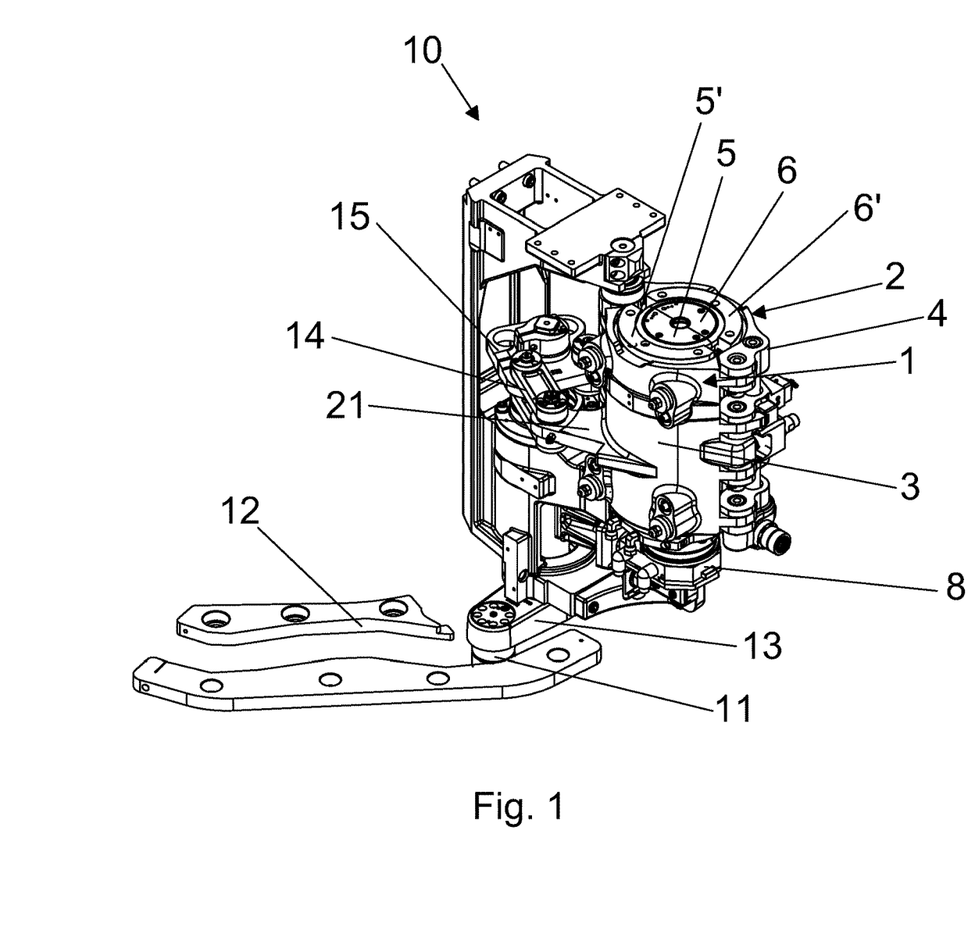
FIG. 1 shows an axonometric view of the mold of the invention in a first embodiment thereof, connected to a cam track, partially illustrated, and in a first configuration.
Figure 2:
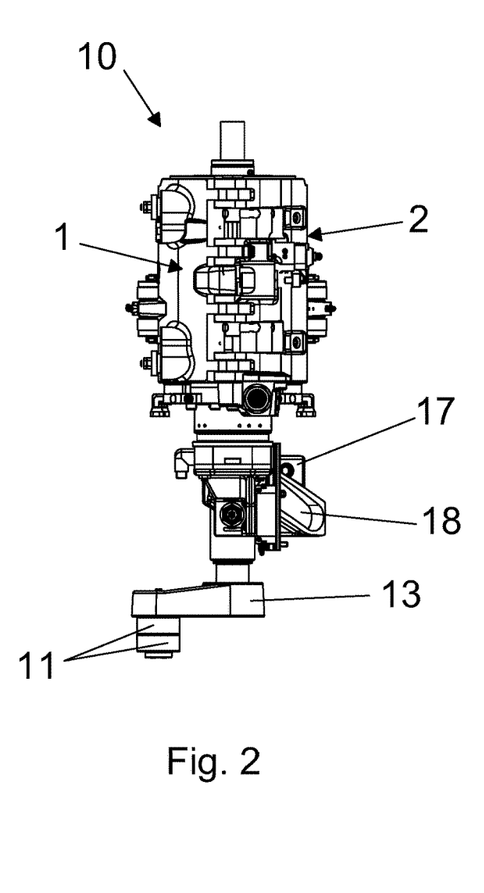
FIG. 2 shows a front view of the mold in FIG. 1.
Figure 3:
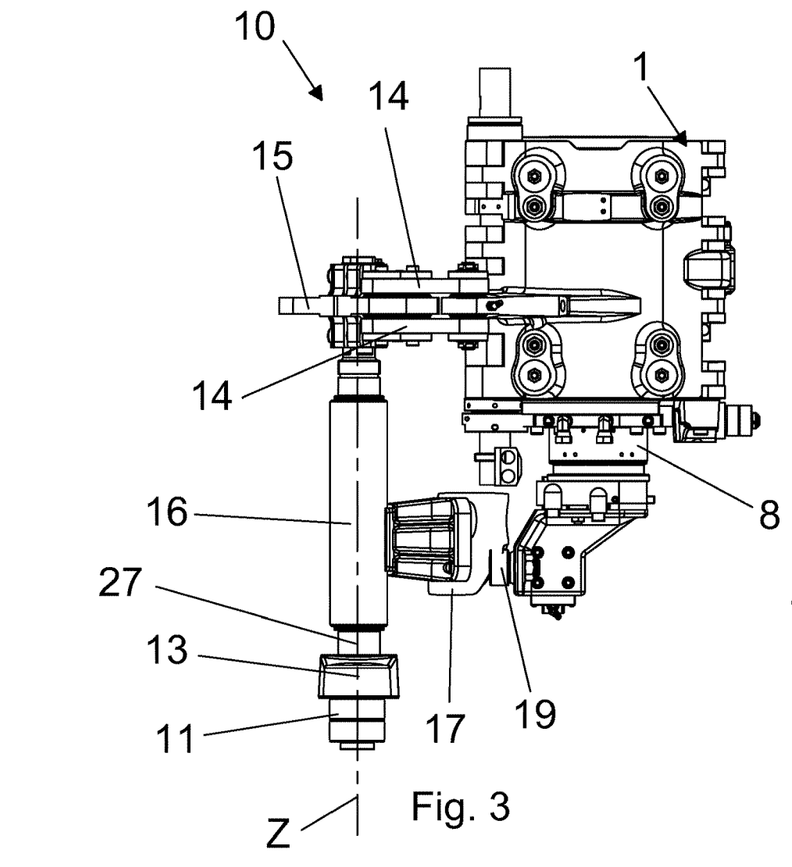
FIG. 3 shows a lateral view of the mold in FIG. 1.
Figure 4:
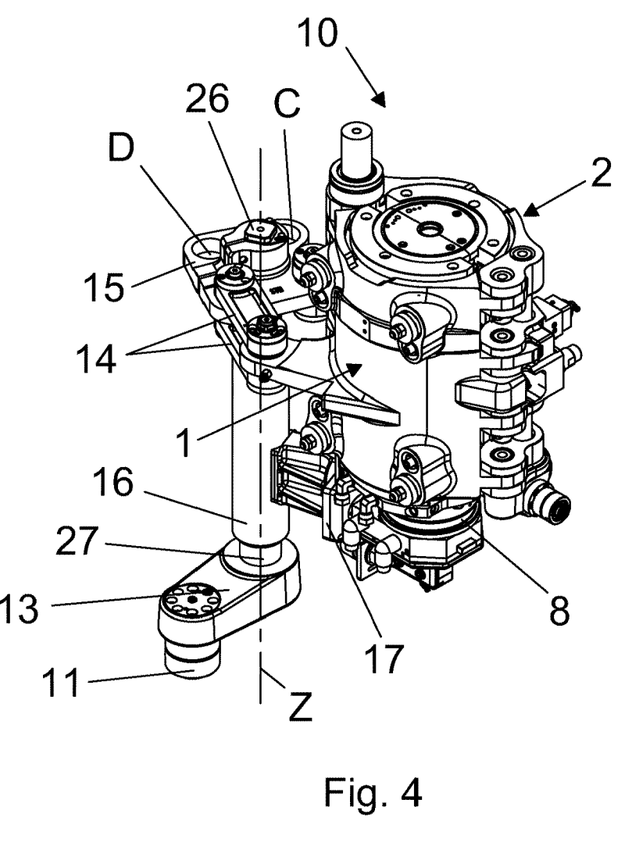
FIG. 4 shows an axonometric view of the mold in FIG. 1.
Figure 5:
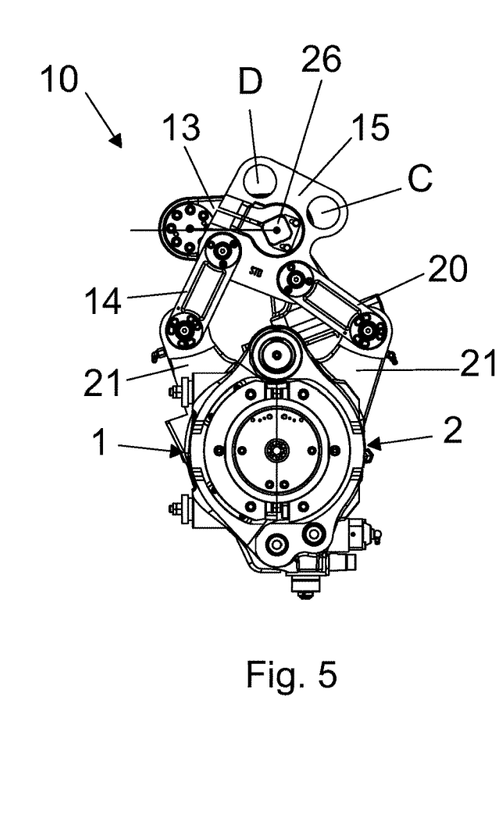
FIG. 5 shows a plan view of the mold in FIG. 1.
Figure 6:
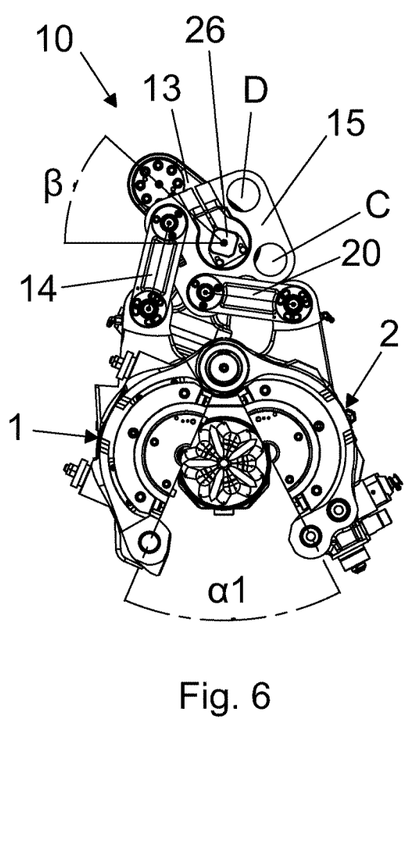
FIG. 6 shows a plan view of the mold in FIG. 1, in maximum opening position with a maximum opening angle α1, according to the first configuration.
Figure 12:
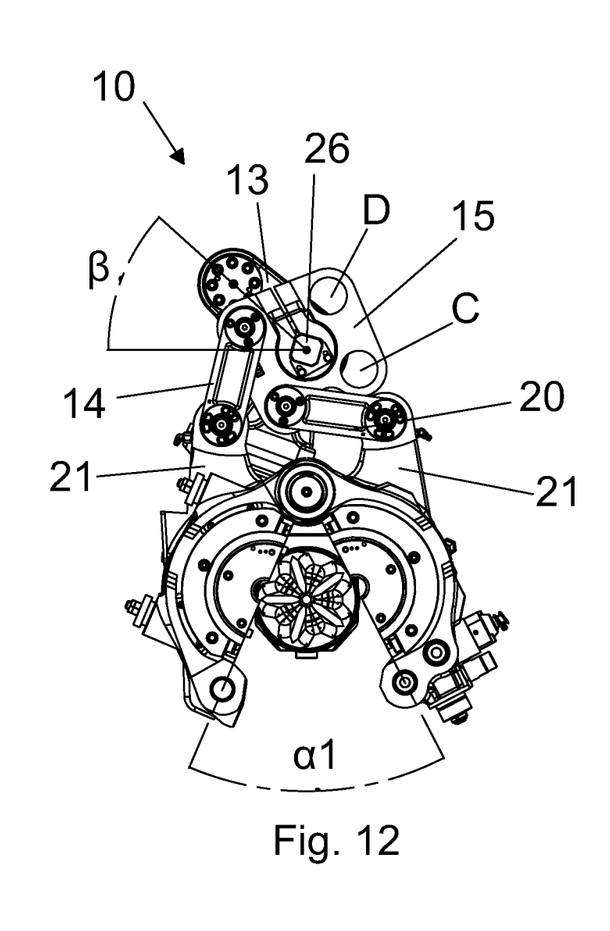
FIG. 12 shows a top view of the mold in FIG. 10.
Figure 13:
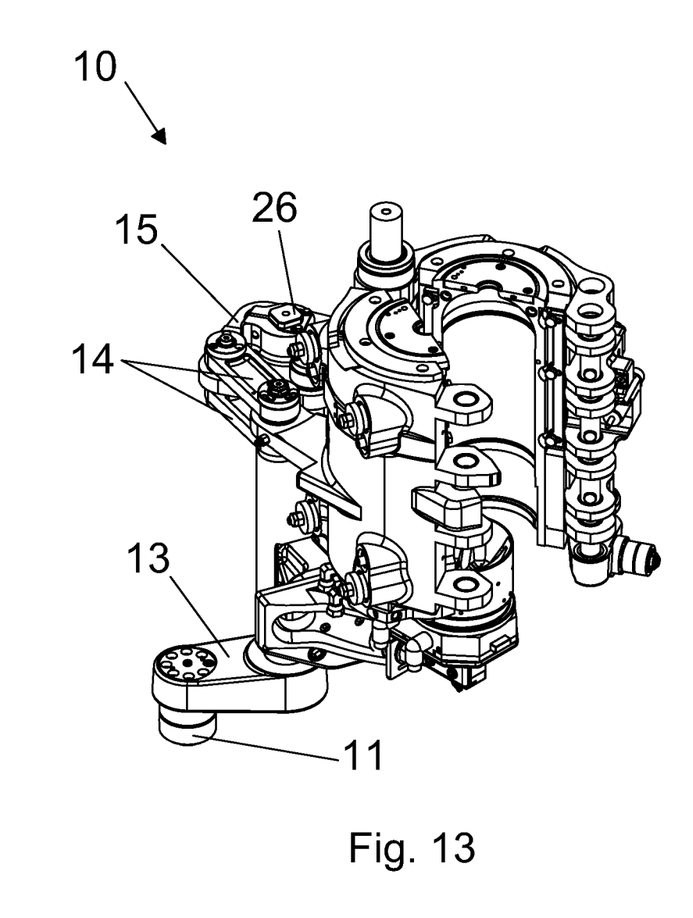
FIG. 13 shows an axonometric view of the mold in FIG. 10.
Figure 14:
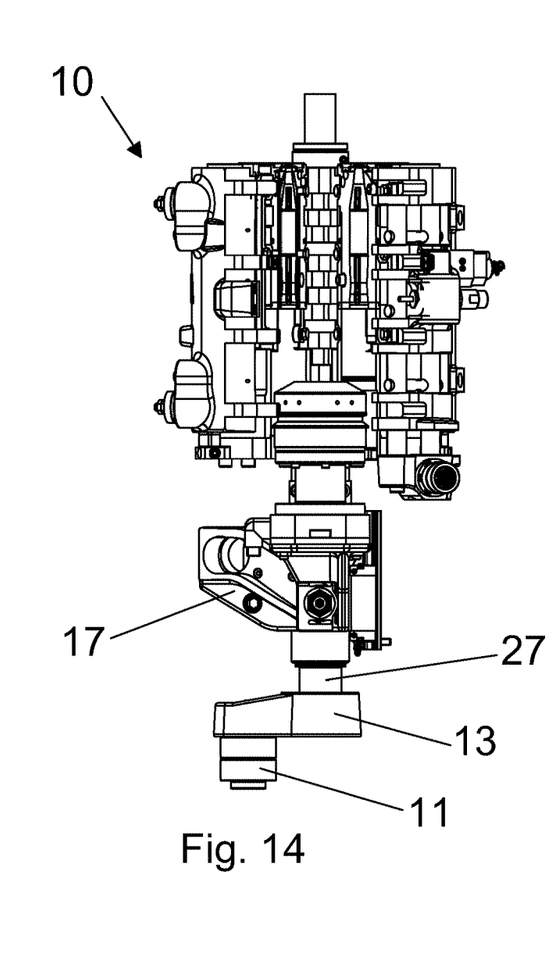
FIG. 14 shows a front view of the mold in FIG. 7.
Figure 15:
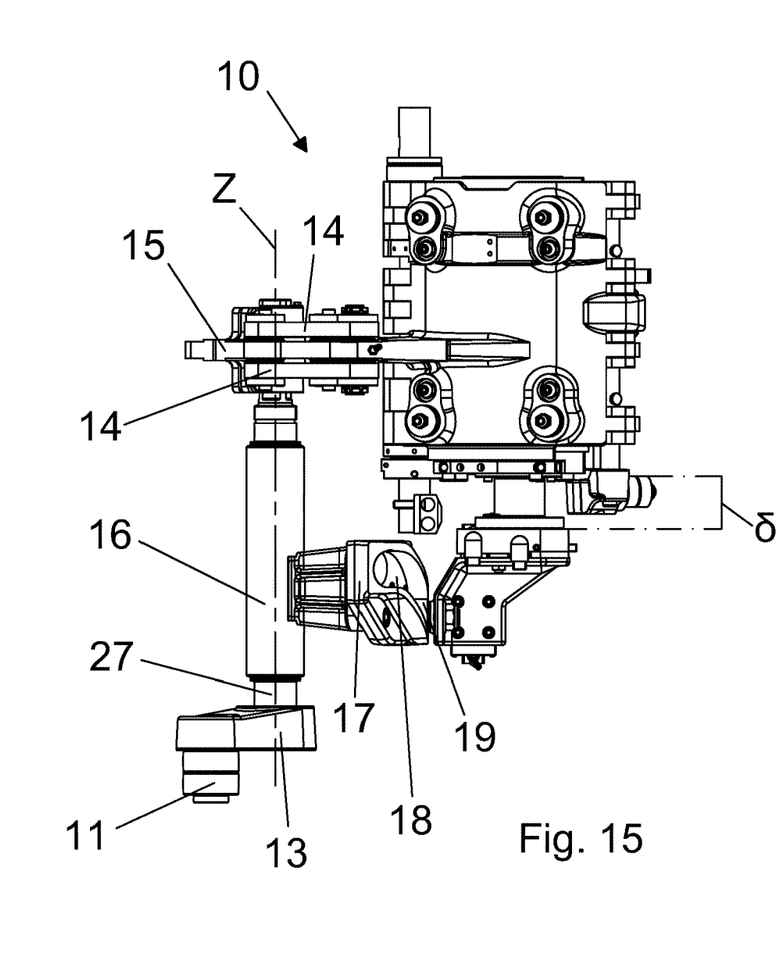
FIG. 15 shows a lateral view of the mold in FIG. 14.

As stated, the control hub 15 can be connected to the pairs of connecting rods 14, 20 in two different ways, defining two maximum opening operating positions or maximum opening configurations. In particular, in the first operating position the pairs of connecting rods 14, 20 are hinged by means of the holes A and B, respectively. Thereby, with particular reference to FIG. 6 and to FIG. 12, the rotation of the control shaft 16 by the angle β determines the opening of the mold 10 by and angle α1. The angle α1 is, in this configuration, the maximum opening angle of the mold 10 and it is formed between the two half molds 1, 2 when they are in maximum opening position. When the mold 10 is closed, the opening angle is equal to 0°.

Figure 7:
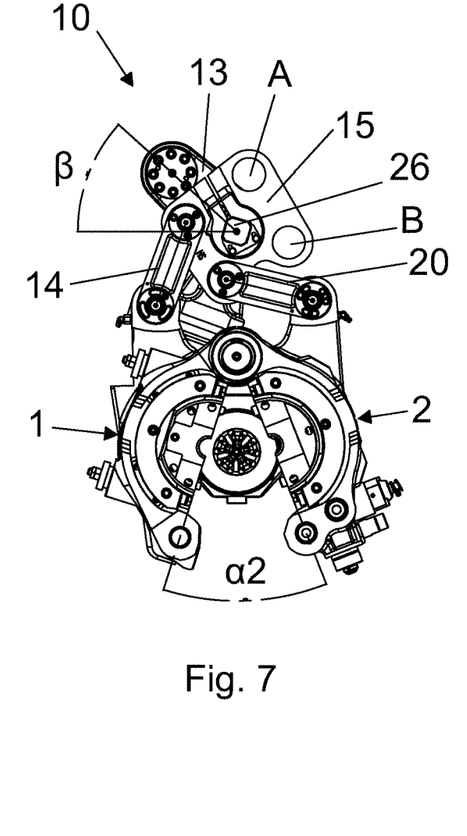
FIG. 7 shows a plan view of the mold in FIG. 1 in a second configuration, open by a second maximum opening angle α2.
Figure 8:
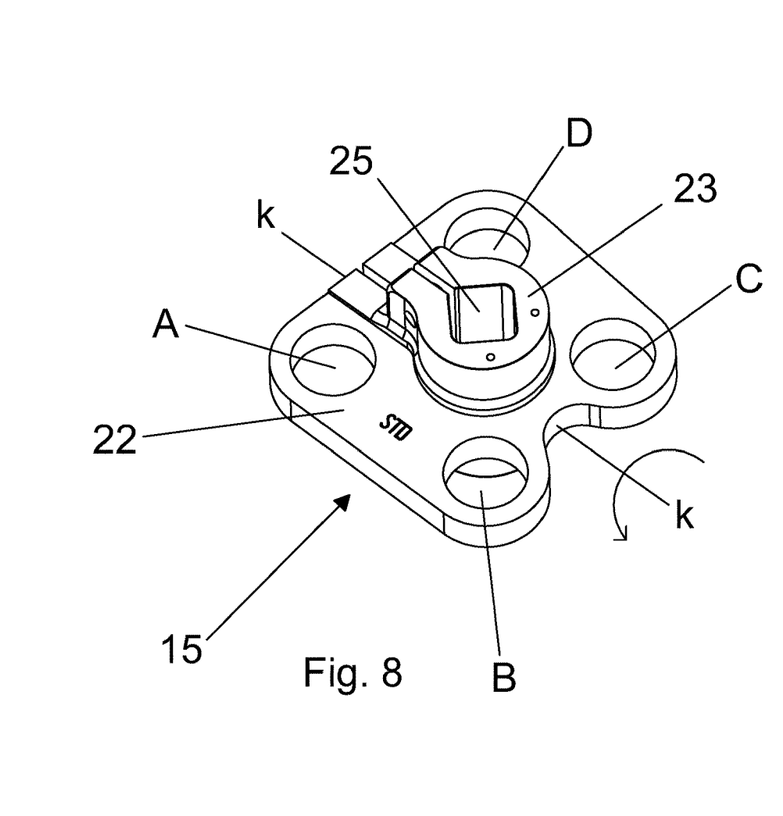
FIG. 8 shows a first axonometric view of a component of the mold in FIG. 1.
Figure 9:
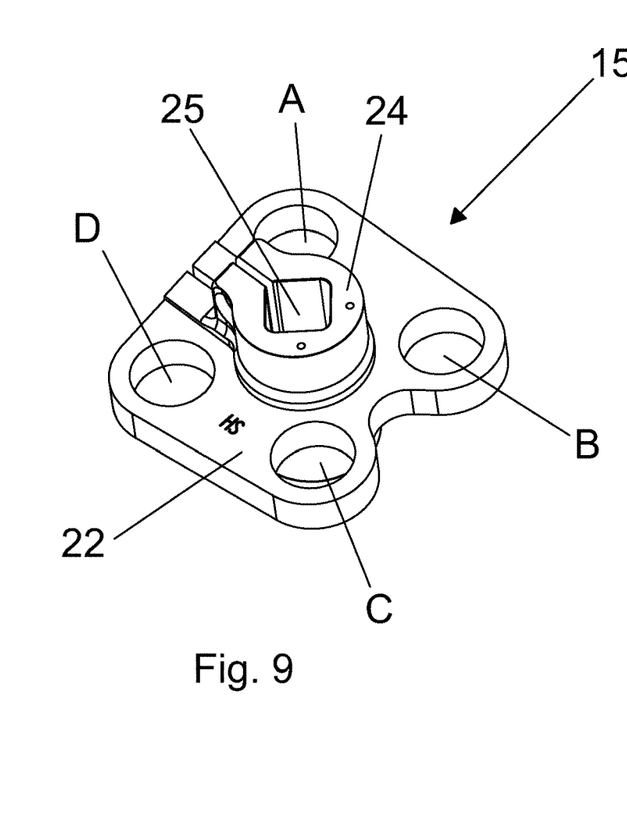
FIG. 9 shows a second axonometric view of a component of the mold in FIG. 8.
Figure 10:
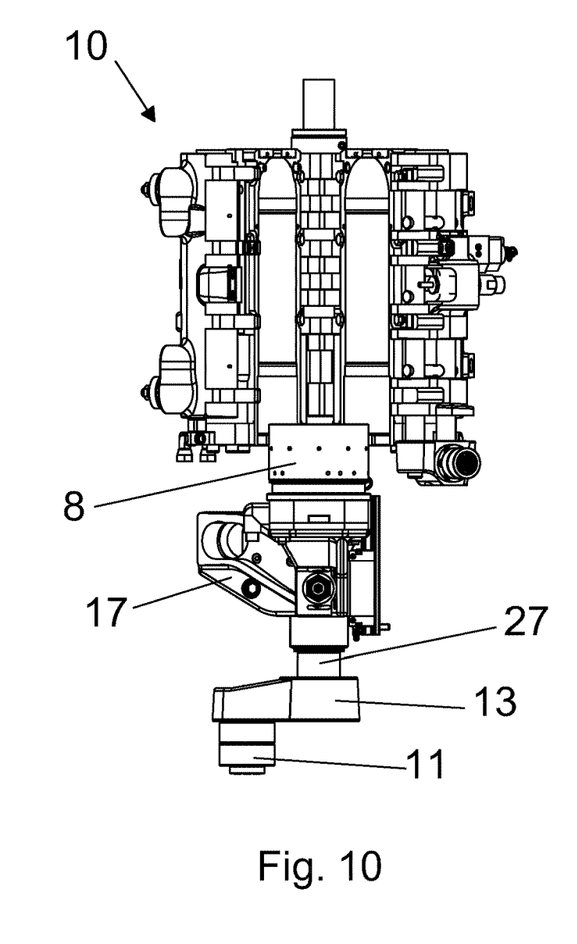
FIG. 10 shows a front view of the mold in FIG. 1 in maximum opening position.
Figure 11:
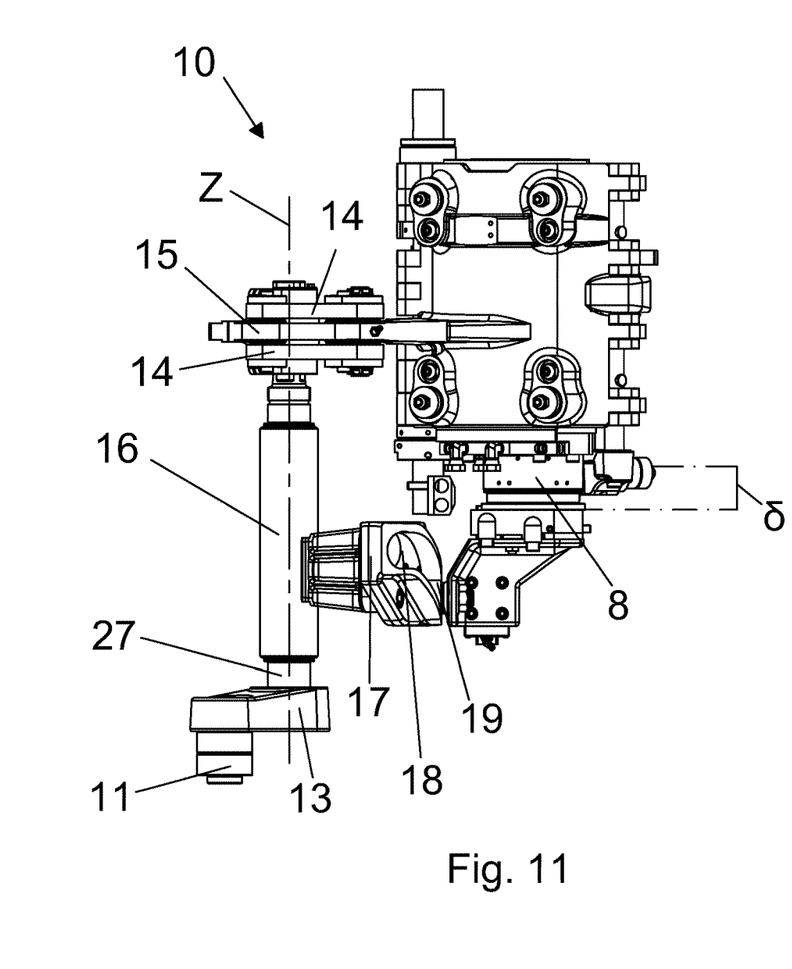
FIG. 11 shows a lateral view of the mold in FIG. 10.
Figure 16:
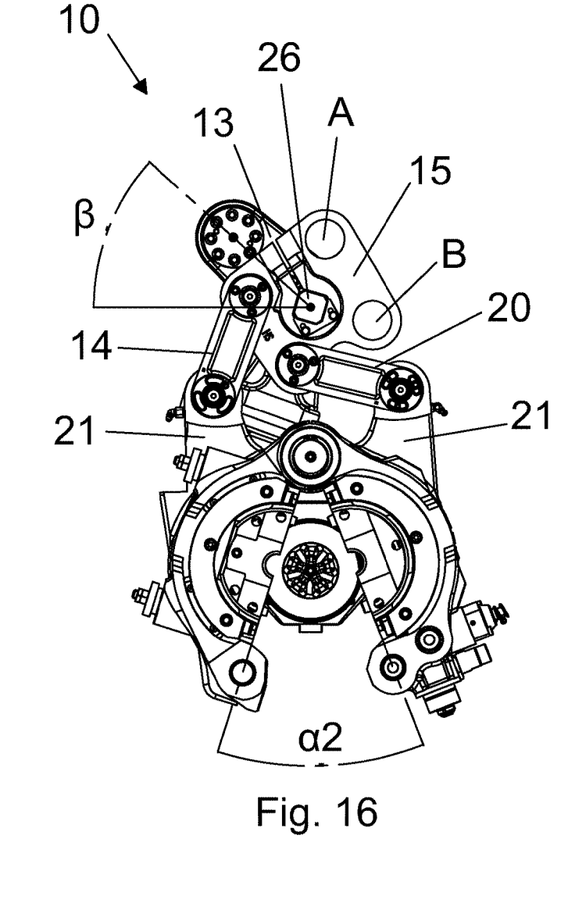
FIG. 16 shows a top view of the mold in FIG. 14.
Figure 17:
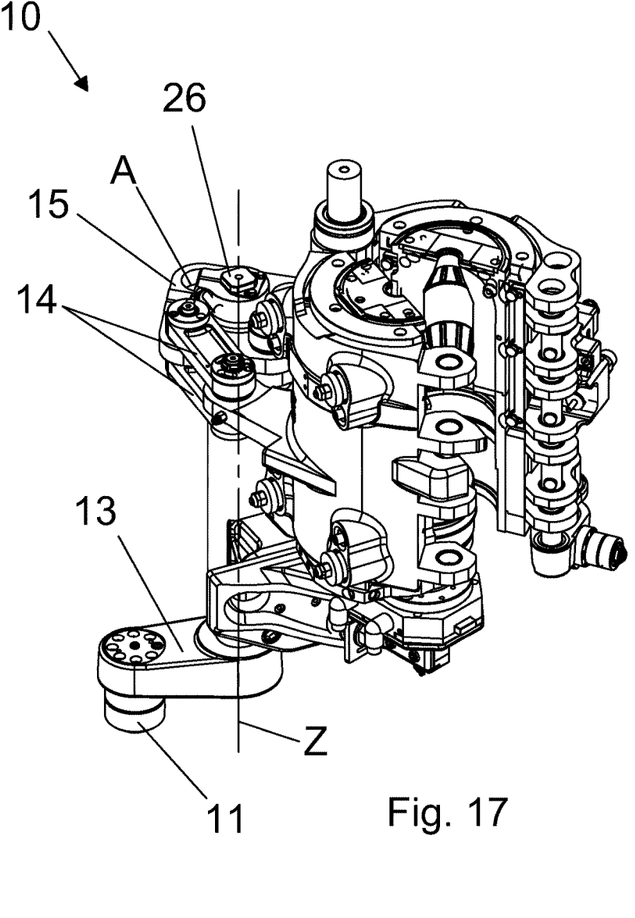
FIG. 17 shows an axonometric view of the mold in FIG. 14.

The second operating position is preferably obtained rotating the control hub 15 by 180° with respect to the axis k-k, or in other words overturning it so as to reverse the faces of the plate 22. In the second operating position the pairs of connecting rods 14, 20 are hinged by means of the holes C and D, respectively. Thereby, with particular reference to FIG. 7 and to FIG. 16, the rotation of the control shaft 16 by the angle β, which is the same angle β of the first operating position, determines the opening of the mold by an angle α2. The angle α2 is smaller than the angle α1 and in this case it is the maximum opening angle of the mold 10.

Figure 18:
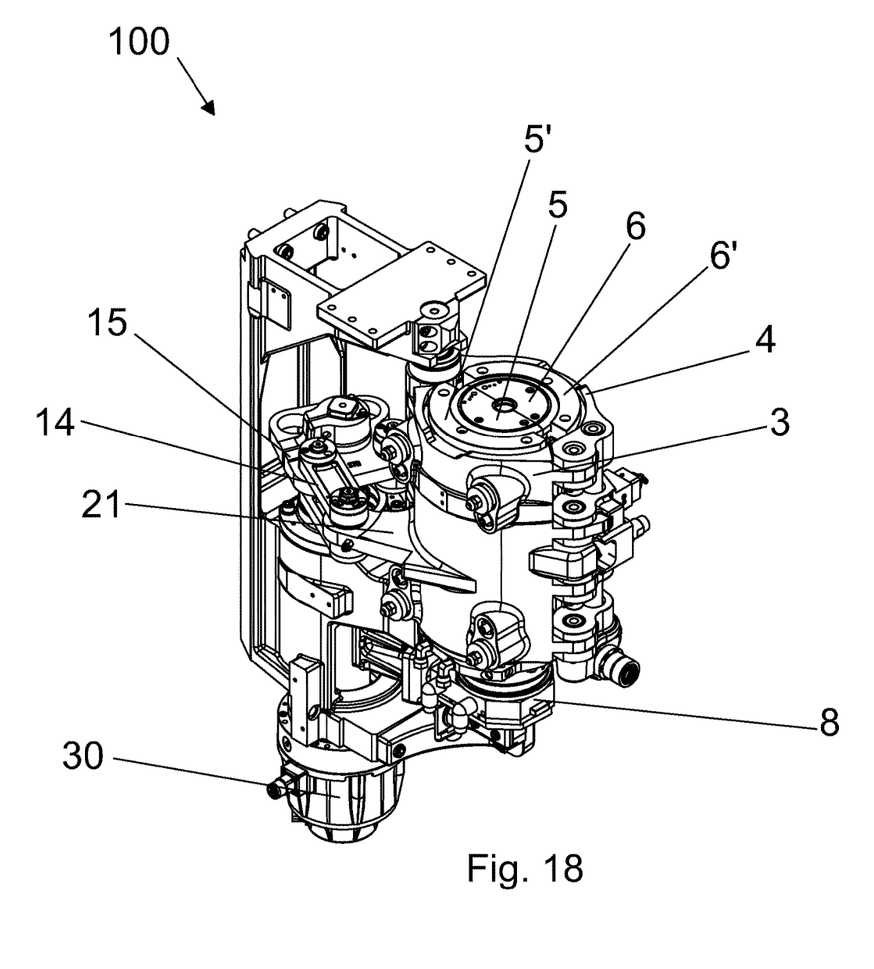
FIG. 18 shows an axonometric view of the mold of the invention in a second embodiment thereof.

Therefore, providing the control hub 15, it is possible to obtain two operating position for which at equal angle β of rotation of the control shaft 16 in the first operating position the maximum opening angle of the mold 10 is equal to α1 and in the second operating position the maximum opening angle of the mold 10 is equal to α2. The two different opening angles are obtained due to the arrangement of the holes A, B, C, D of the control hub 15. In particular, the angle α1 is greater than the angle α2 in that, as stated previously, the distance between the holes A and B is greater than the distance between the holes C and D. Considering that α1>α2, and that therefore the space available for the extraction of the produced container is different in the two cases, the first operating position is used for the production of containers of larger dimensions with respect to the containers which are produced using the second operating position. For example, the first operating position is used for containers with cross section S1 greater than the cross section S2 produced with the second operating position. According to a second embodiment, alternative to the previous one and illustrated in FIG. 18, the relative motion of the various parts which form the mold 100 can be produced by a servomotor 30. In particular, according to this embodiment, the servomotor 30, typically also known as torque motor, sets in rotation the control shaft 16 and through the control hub 15 and the system of connecting rods 14, 20 produces both the opening motion of the two half molds 1, 2 and the alternative up and down motion of the mold bottom 8.

Figure 21:
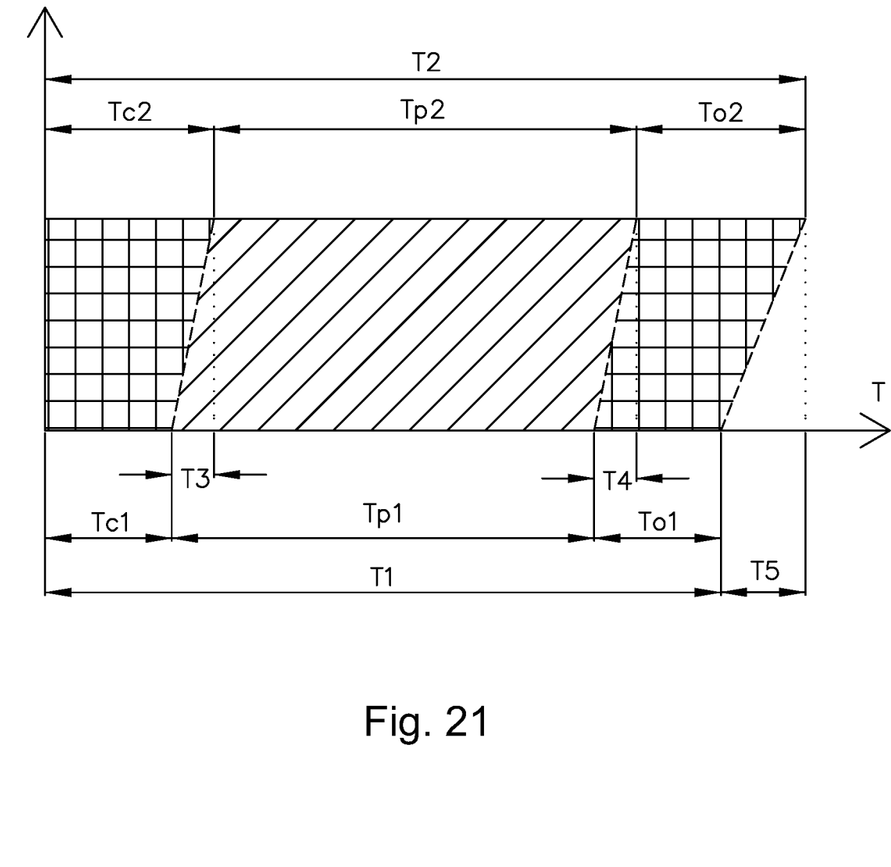
FIG. 21 shows a diagram of the cycle time for the production of a thermoplastic container made with a mold of the invention.

FIG. 21 shows a chart illustrating the cycle time advantage afforded by the invention to a blow molding machine. As already mentioned above, for container molding devices, the productivity, which is measured in containers/h/cavity, is related to the cycle time T according to the expression:

Productivity [Containers/$h$/cavity]=3600/$T$cycle [$s$].

This cycle time is the sum of:
a time for the first step dedicated to the insertion of a preform in the mold and the closing and constraint of the half molds, indicated with Tc,
a time for a second step dedicated to the blow molding process indicated with Tp,
a time for a third step dedicated to the release of the mold, the opening of the lateral half molds and the lowering of the mold bottom and the extraction of the finished container from the mold, indicated with To.

The references T2, Tp2, To2 and T1, Tp1, To1 are indicated with reference to a large container and to a small container, respectively.

Figure 19A:
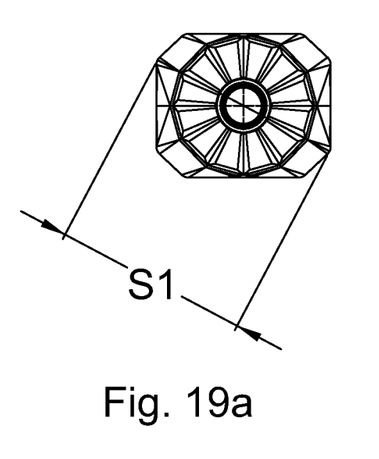
FIGS. 19a and 19b show a plan view and an axonometric view of a bottle of a first format, respectively, which can be produced with a mold of the invention.
Figure 19B:
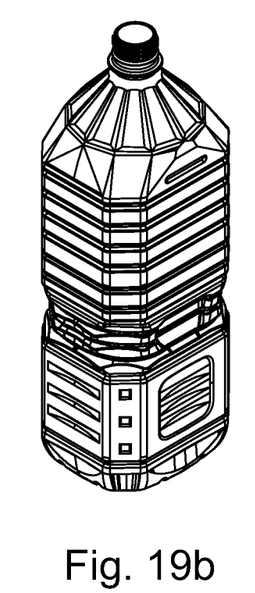

A cycle time for the production of a large container, such as for example the bottle shown in FIG. 19, is indicated with the reference T2 in the chart of FIG. 21. For this case, the maximum opening of the mold 10 is equal to α1.

Figure 20A:
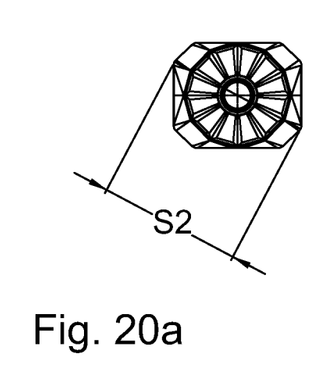
FIGS. 20a and 20b show a plan view and an axonometric view of a bottle of a second format, respectively, which can be produced with a mold of the invention.
Figure 20B:
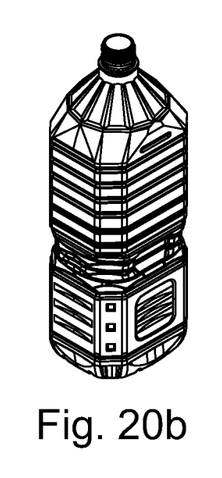

If the mold of the invention is used to produce a smaller container, such as a bottle of a shape similar to that in FIG. 20 but with smaller volume, for which a smaller maximum opening of the lateral half molds is sufficient, it is noted that the total cycle time indicated with T1 is shorter than the cycle time T2. Since the time difference to perform the blowing step Tp1 does not differ much from step Tp2, depending in fact mainly on the type of material used to make the container, the cycle time reduction is accomplished by reducing the opening step time To1 and the closing step time Tc1 which are shorter than the times of the corresponding To2 and Tc2 by a value T4 and T3, respectively. Due to these time gains, there is a reduction in the cycle time of the mold equal to T5 whenever it is used to make containers of sizes smaller than those which are the maximum achievable with the mold itself.

According to one aspect, the invention also provides a rotary blow molding machine comprising a plurality of molds as described previously.

According to an additional aspect, the invention also provides a method for changing the maximum opening configuration of a blowing mold as described previously, comprising the following steps:

a) removing one or both of said at least one first connecting rod 14 and at least one second connecting rod 20 from said first pair of holes;

b) fixing one or both of said at least one first connecting rod 14 and at least one second connecting rod 20 to said second pair of holes;

so as to switch from said first maximum opening configuration, prior to step a), with a first maximum opening angle, to a second maximum opening configuration, upon completion of step b), with a first maximum opening angle different from the first maximum opening angle.

The invention claimed is:

1. A blowing mold for a thermoplastic material container, comprising two half molds hinged together and a cyclic opening and closing device adapted to reciprocally move away and approach the two half molds with an opening angle ranging from 0° in a closed position of the half molds to a maximum opening angle in a position of maximum opening of the two half molds, the cyclic opening and closing device comprising a control shaft adapted to rotate about an axis Z thereof, a control hub integrally fixed to the control shaft, at least one first connecting rod and at least one second connecting rod, each having a first end hinged to a respective half mold and a second end hinged to the control hub, wherein a rotation of the control shaft by an angle of rotation $\beta$ corresponds to the position of maximum opening of the two half molds, wherein the control hub is fixed in a removable manner to an end of the control shaft and is provided with at least three holes for hinging the second ends of said at least one first connecting rod and at least one second connecting rod, wherein the at least three holes define at least two different pairs of holes, of which a first pair defines a first maximum opening configuration of the half molds corresponding to a first maximum opening angle $\alpha 1$, and a second pair defines a second maximum opening configuration of the half molds corresponding to a second maximum opening angle $\alpha 2$, with $\alpha 2$ being smaller than $\alpha 1$, and wherein the at least one first connecting rod and the at least one second connecting rod are fixed to a respective hole of the first pair of holes when the mold can operate in the first maximum opening configuration, and the at least one first connecting rod and the at least one second connecting rod are fixed to a respective hole of the second pair of holes when the mold can operate in the second maximum opening configuration.

2. The blowing mold according to claim 1, wherein a distance between a center of a first hole and a center of a second hole is greater than a distance between the center of the second hole and a center of a third hole.

3. The blowing mold according to claim 1, wherein the control hub is provided with four holes, wherein a distance between a center of a first hole and a center of a second hole is greater than a distance between a center of a third hole and a center of a fourth hole.

4. The blowing mold according to claim 3, wherein said first maximum opening configuration provides that the at least one first connecting rod is hinged to the first hole and the at least one second connecting rod is hinged to the second hole, and wherein said second maximum opening configuration provides that the at least one first connecting rod is hinged to the third hole and the at least one second connecting rod is hinged to the fourth hole.

5. The blowing mold according to claim 1, wherein there are provided two first connecting rods and two second connecting rods.

6. The blowing mold according to claim 1, comprising a mold bottom adapted to move cyclically along a direction parallel to the axis Z synchronized with the opening and closing of the two half molds.

7. The blowing mold according to claim 6, comprising a cam track integral with the control shaft and a cam follower integral with the mold bottom and adapted to slide in the cam track.

8. The blowing mold according to claim 7, comprising a lever integral to the control shaft and a roller integral to the control shaft and adapted to slide in a further cam track.

9. The blowing mold according to claim 1, comprising a servomotor for a rotation of the control shaft.

10. A rotary blow molding machine comprising a plurality of blowing molds according to claim 1.

11. A method for changing a maximum opening configuration of a blowing mold according to claim 1 from a first maximum opening configuration to a second maximum opening configuration, wherein there are provided the following steps:

a) removing one or both of said at least one first connecting rod and at least one second connecting rod from the said pair of holes;

b) fixing one or both of said at least one first connecting rod and at least one second connecting rod to said second pair of holes, so as to switch from said first maximum opening configuration, prior to step a), with a first maximum opening angle, to a second maximum opening configuration, upon completion of step b), with a second maximum opening angle different from the first maximum opening angle.

\* \* \* \* \*